(12) United States Patent
Moon

(10) Patent No.: US 12,382,241 B2
(45) Date of Patent: Aug. 5, 2025

(54) GEO-FENCE ALARM METHOD AND SYSTEM FOR PROVIDING THE METHOD

(71) Applicants: HYUNDAI MOTOR COMPANY, Seoul (KR); KIA CORPORATION, Seoul (KR)

(72) Inventor: Sunghwan Moon, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 584 days.

(21) Appl. No.: 17/585,987

(22) Filed: Jan. 27, 2022

(65) Prior Publication Data

US 2023/0096908 A1    Mar. 30, 2023

(30) Foreign Application Priority Data

Sep. 29, 2021  (KR) ........................ 10-2021-0128791

(51) Int. Cl.
*H04W 4/021* (2018.01)
*G01C 21/00* (2006.01)
*H04W 4/02* (2018.01)
*H04W 4/029* (2018.01)

(52) U.S. Cl.
CPC ........ *H04W 4/021* (2013.01); *G01C 21/3804* (2020.08); *H04W 4/023* (2013.01); *H04W 4/029* (2018.02)

(58) Field of Classification Search
CPC ..... H04W 4/021; H04W 4/023; H04W 4/029; H04W 4/026; H04W 4/20; H04W 4/40; G01C 21/3804
See application file for complete search history.

(56) References Cited

U.S. PATENT DOCUMENTS

| | | | | |
|---|---|---|---|---|
| 2015/0156744 A1* | 6/2015 | Haro | ...................... | H04W 4/021 |
| | | | | 455/456.1 |
| 2019/0281408 A1* | 9/2019 | Zhao | ........................ | H04L 43/10 |
| 2021/0168556 A1* | 6/2021 | Park | ........................ | H04W 4/021 |
| 2022/0364881 A1* | 11/2022 | Fujiyoshi | ............. | G01C 21/367 |

FOREIGN PATENT DOCUMENTS

| | | |
|---|---|---|
| KR | 101759134 B1 | 7/2017 |
| KR | 101820288 B1 | 1/2018 |
| KR | 102199206 B1 | 1/2021 |

* cited by examiner

*Primary Examiner* — Lester G Kincaid
*Assistant Examiner* — Abdullah Al Mamun
(74) *Attorney, Agent, or Firm* — Lempia Summerfield Katz LLC

(57) ABSTRACT

A geo-fence alarm system determines an entry of a moving object into a destination zone or an exit of the moving object from the destination zone and generates an alarm message. In particular, the system includes: a mobile terminal which generates a geo-fence boundary line of the destination zone according to a predetermined setting reference and maps the generated geo-fence boundary line to a first map, generates an inbound boundary line and an outbound boundary line, each of which is spaced apart from the geo-fence boundary line, and maps at least one of the inbound boundary line or the outbound boundary line to the first map. The mobile terminal determines whether the moving object enters or exits the destination zone based on the inbound and outbound boundary lines and location information of the moving object, and generates an alarm message corresponding to the entry or exit of the moving object.

14 Claims, 10 Drawing Sheets

FIG. 1 "PRIOR ART"

GEO-FENCE ALARM METHOD AND SYSTEM FOR PROVIDING THE METHOD

CROSS-REFERENCE TO RELATED APPLICATION

This application claims priority to and the benefit of Korean Patent Application No. 10-2021-0128791, filed in the Korean Intellectual Property Office on Sep. 29, 2021, the entire contents of which are incorporated herein by reference.

FIELD

The present disclosure relates to a geo-fence alarm method of generating an alarm message, and a system for performing the method.

BACKGROUND

Geo-fence technology is the technology that establishes a boundary that is a virtual fence for a specific zone based on a location information solution. Recently, the geo-fence technology is combined with various services to be applied to vehicle terminals, customer terminals, and the like. In this case, the geo-fence is a compound word of "geographic" and "fence".

For example, when a vehicle enters into or goes out of a boundary line that is a virtual fence of a predetermined zone, the vehicle terminal providing the geo-fence technology may provide a driver with an alarm about the state in which the vehicle is in or out of the boundary line. In this case, the boundary line may be set by a manager according to a predetermined reference. Then, the driver of the vehicle may recognize the entry or exit of the predetermined zone.

In the meantime, when the driver is unfamiliar with the area in which the destination is located, the driver may wander around the destination in order to find an entrance of the destination and the like. In this case, the vehicle may repeat the entry or the exit of the boundary line of the destination zone. That is, an erroneous alarm may be frequently provided to the driver even though the vehicle does not actually arrive at the destination. This may cause confusion for the driver in the vehicle.

The above information disclosed in this Background section is only for enhancement of understanding of the background of the present disclosure, and therefore it may contain information that does not form the prior art that is already known to a person of ordinary skill in the art.

SUMMARY

The present disclosure has been made in an effort to provide a geo-fence alarm method which is capable of accurately determining an entry event or an exit event, and a system for performing the method. The entry event may include a moving object entering to a destination zone, and the exit event may include the moving object exiting from the destination zone.

In one embodiment of the present disclosure, a geo-fence alarm system may determine an entry of a moving object into a destination zone or an exit of the moving object from the destination zone and generate an alarm message. The system may include: a mobile terminal which generates a geo-fence boundary line that is a boundary line of the destination zone according to a predetermined setting reference and maps the generated geo-fence boundary line to a first map, generates an inbound boundary line spaced apart at a predetermined interval inward along the geo-fence boundary line and an outbound boundary line spaced apart at a predetermined interval outward along the geo-fence boundary line, and maps at least one of the inbound boundary line and the outbound boundary line to the first map, in which the mobile terminal is the terminal equipped in the moving object or possessed by the moving object, and determines whether the moving object enters the destination zone based on the inbound boundary line and location information of the moving object, and determines whether the moving object exits from the destination zone based on the outbound boundary line and the location information of the moving object, and generates an alarm message corresponding to the entry of the moving object or the exit of the moving object according to a result of the determination.

Another embodiment of the present disclosure provides a geo-fence alarm method that is a method of determining, by a mobile terminal equipped to a moving object or included in the moving object, an entry of the moving object into a destination zone or an exit of the moving object from the destination zone and generating an alarm message. The method may include: a geo-fence boundary line generating operation for generating a geo-fence boundary line that is a boundary line of the destination zone according to a predetermined setting reference and mapping the generated geo-fence boundary line to a first map; an inbound/outbound boundary line generating operation for mapping the generated geo-fence boundary line to a first map, generating an inbound boundary line spaced apart, by a predetermined interval, inwardly from the geo-fence boundary line and an outbound boundary line spaced apart, by a predetermined interval, outwardly from the geo-fence boundary line, and mapping at least one of the inbound boundary line and the outbound boundary line to the first map; and an operation for determining whether the moving object enters the destination zone based on the inbound boundary line and location information of the moving object, determining whether the moving object exits from the destination zone based on the outbound boundary line and the location information of the moving object, and generating an alarm message corresponding to the entry of the moving object or the exit of the moving object according to a result of the determination.

The present disclosure additionally generates a predetermined boundary line for a determination delay in the inside and the outside of a geo-fence boundary line that is a boundary line of a destination zone, so that an alarm may be generated only in the case where a moving object actually enters or exits a destination zone.

According to the present disclosure, a user receiving a geo-fence alarm service is capable of accurately recognizing a current location of a moving object and whether the moving object enters a destination zone.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

Figure 1:
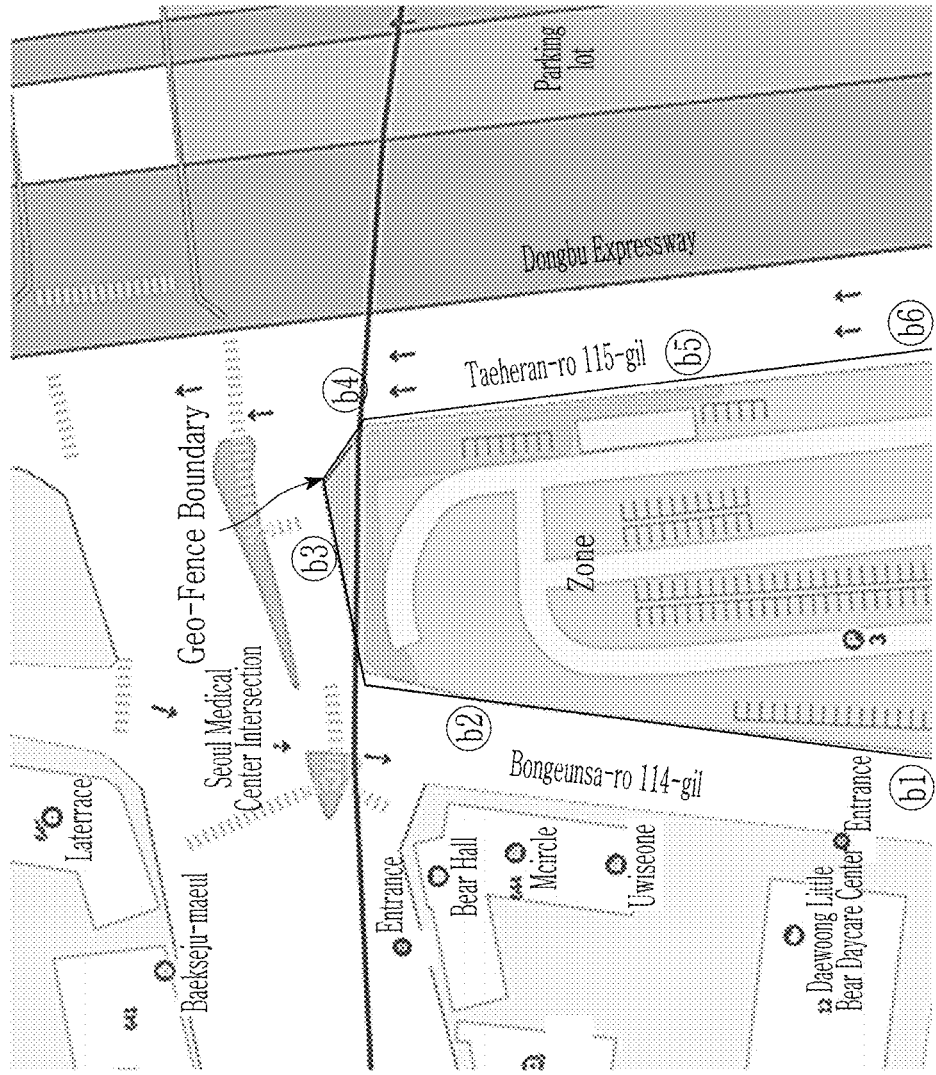
FIG. 1 is a diagram illustrating an example of the geo-fence technology applied to a car sharing service in the related art.

FIG. 1 is a diagram illustrating an example of a geo-fence technology applied to a car sharing service in the related art.

Referring to FIG. 1, a server providing a vehicle with a car sharing service may transmit location information about a zone (or a place) to which the vehicle needs to be returned to a vehicle terminal (for example, a navigation terminal) installed in the vehicle. In this case, the server may monitor a real-time location of the vehicle and a boundary line of a return zone based on a Global Positioning System ("GPS"), and when a situation (event) where the vehicle enters or exits the return zone of the vehicle, the server may transmit an alarm message corresponding to the event to the vehicle terminal.

However, referring to FIG. 1, due to errors b1 and b3 in setting a boundary line of a return zone, an error b2 in recognition of an opposite lane, erroneous recognition b5 of entry of the vehicle to the return zone due to GPS drifting, a GPS error b6, and the like, even in the situation where the vehicle does not actually enter or exit the return zone, the alarm message corresponding to the vehicle entry event or the vehicle exit event is erroneously transmitted to the vehicle terminal, thereby causing misunderstanding or confusion of a user.

Accordingly, when applying the geo-fence technology, a logic capable of generating an alarm message only when a moving object (for example, a vehicle, or a user) actually enters or exits a destination zone is desired.

Hereinafter, an exemplary embodiment disclosed the present specification is described in detail with reference to the accompanying drawings, and the same or similar constituent element is denoted by the same reference numeral regardless of a reference numeral, and a repeated description thereof is omitted. Suffixes, "module" and "unit" for a constituent element used for the description below are given or mixed in consideration of only easiness of the writing of the specification, and the suffix itself does not have a discriminated meaning or role. Further, in describing the exemplary embodiment disclosed in the present disclosure, when it is determined that detailed description relating to well-known functions or configurations may make the subject matter of the exemplary embodiment disclosed in the present disclosure unnecessarily ambiguous, the detailed description is omitted. Further, the accompanying drawings are provided for helping to easily understand exemplary embodiments disclosed in the present specification, and the technical spirit disclosed in the present specification is not limited by the accompanying drawings, and it should be appreciated that the present disclosure includes all of the modifications, equivalent matters, and substitutes included in the spirit and the technical scope of the present disclosure.

Terms including an ordinary number, such as first and second, are used for describing various constituent elements, but the constituent elements are not limited by the terms. The terms are used only to discriminate one constituent element from another constituent element.

It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" or "directly connected to" another constituent element, it should be understood that there are no intervening elements.

In the present disclosure, it should be appreciated that terms "including" and "having" are intended to designate the existence of characteristics, numbers, steps, operations, constituent elements, and components described in the present disclosure or a combination thereof, and do not exclude a possibility of the existence or addition of one or more other characteristics, numbers, steps, operations, constituent elements, and components, or a combination thereof in advance.

When a component, device, element, or the like of the present disclosure is described as having a purpose or performing an operation, function, or the like, the component, device, or element should be considered herein as being "configured to" meet that purpose or to perform that operation or function.

The operations of the method or the algorithm described in connection with the forms disclosed herein may be embodied directly in a hardware (e.g., a processor) or a software module executed by the processor, or in a combination thereof. As publicly known in the art, some of exemplary forms may be illustrated in the accompanying drawings from the viewpoint of function blocks, units and/or modules.

Those having ordinary skill in the art should understand that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in the present disclosure.

Figure 2:
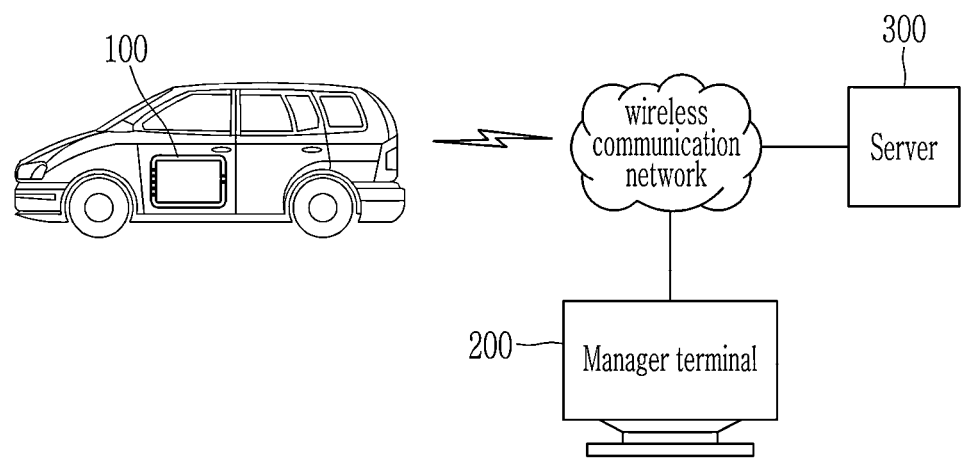
FIG. 2 is a block diagram illustrating a geo-fence alarm system according to an exemplary embodiment.
Figure 3:
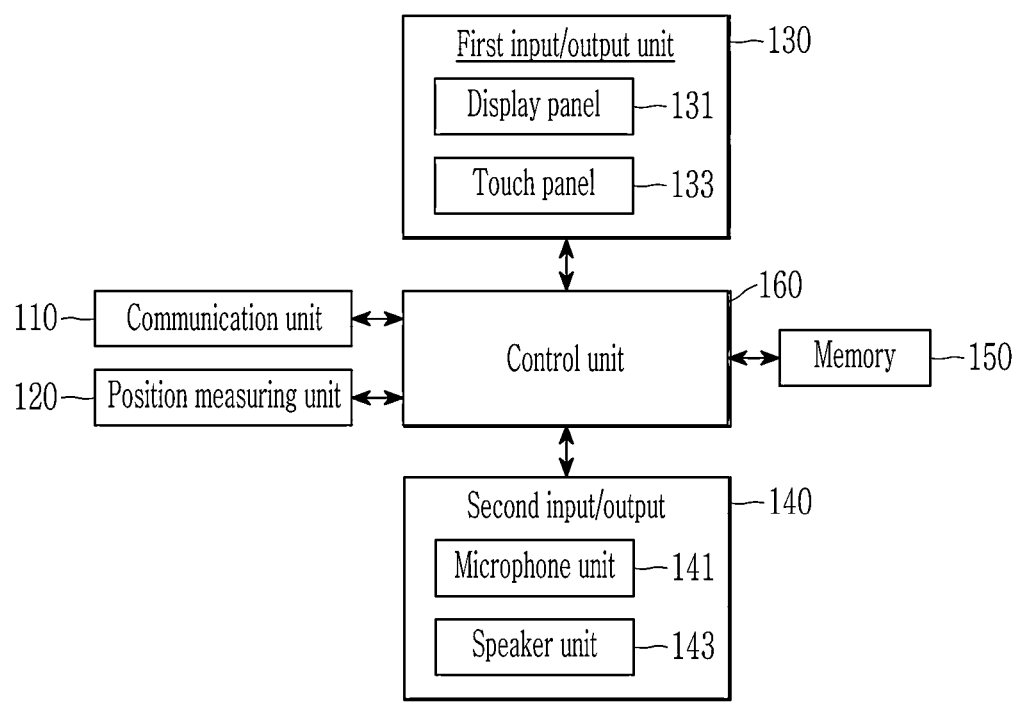
FIG. 3 is a block diagram illustrating a configuration of a mobile terminal of FIG. 2 in detail.
Figure 4:
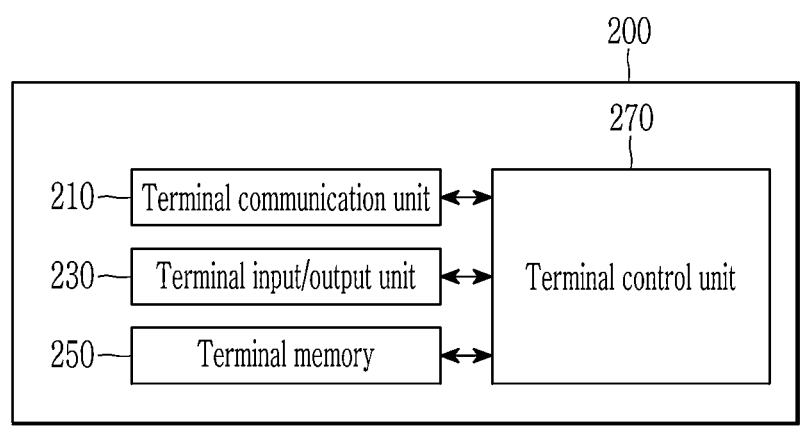
FIG. 4 is a block diagram illustrating a configuration of a manager terminal of FIG. 2 in detail.
Figure 5:
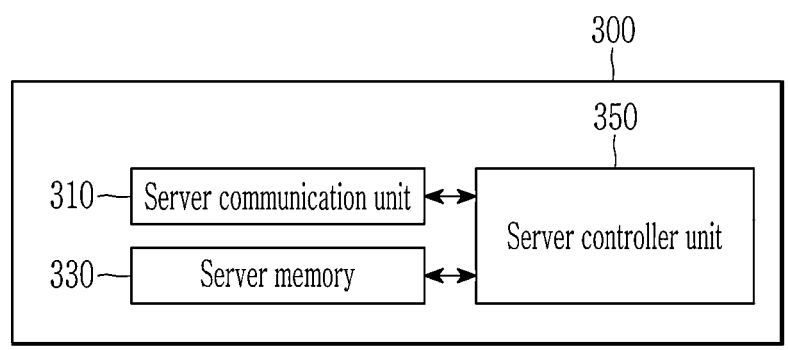
FIG. 5 is a block diagram illustrating a configuration of a server of FIG. 2 in detail.

FIG. 2 is a block diagram illustrating a geo-fence alarm system according to an exemplary embodiment, FIG. 3 is a block diagram illustrating a configuration of a mobile terminal of FIG. 2 in detail, FIG. 4 is a block diagram illustrating a configuration of a manager terminal of FIG. 2 in detail, and FIG. 5 is a block diagram illustrating a configuration of a server of FIG. 2 in detail.

Referring to FIG. 2 a geo-fence alarm system includes a mobile terminal 100, a manager terminal 200, and a server 300.

Hereinafter, a geo-fence alarm method applied to a car sharing service and a system for providing the method are described, but the present disclosure is not limited thereto. The present disclosure is applicable to various exemplary embodiments, such as an advertisement providing service according to whether a customer moving in a shopping mall enters within a predetermined radius of a store.

The mobile terminal 100 may provide a driver (user) of a moving object with an alarm service as to whether the moving object enters a destination zone or exits the destination zone. The mobile terminal 100 may be equipped with a navigation terminal, an AUDIO, VIDEO, NAVIGATION (AVN) or In-Vehicle Infotainment (IVI) system, and the like. In FIG. 2, the mobile terminal 100 is illustrated as the vehicle terminal (navigation terminal and the like) installed in the vehicle, but is not limited thereto. The mobile terminal 100 of the present disclosure may include a terminal equipped in the mobbing object (a bicycle, a kickboard, and the like) and a terminal possessed by a moving object (customer and the like).

Referring to FIG. 3, the mobile terminal 100 includes a communication unit 110, a position measuring unit 120, a first input/output unit 130, a second input/output unit 140, a memory 150, and a control unit 160.

The communication unit 110 may be connected to a wireless communication network to transceive data with the server 300. The communication unit 110 may be connected to the wireless communication network through wireless communication protocols, such as the GSM/3GPP-based communication method (GSM, HSDPA, and LTE-advanced), the 3GPP2-based communication method (CDMA and the like), or Wimax, but is not limited thereto. For example, the communication unit 110 may also be connected to the communication network through the existing communication protocol or a communication protocol to be developed according to the future technology development.

The position measuring unit 120 may detect a position of the mobile terminal 100. For example, the position measuring unit 120 may detect a position of the mobile terminal 100 based on a GPS signal transmitted from a Global Positioning System (GPS) satellite. For another example, the position measuring unit 120 may detect a position of the mobile terminal 100 by communicating with the plurality of base stations. Further, the position measuring unit 120 may also detect a position of the mobile terminal 100 by using other position detecting methods to be provided through the future technology development, as well as the existing position detecting method.

The first input/output unit 130 may include a display panel 131 and a touch panel 133.

The display panel 131 may display a result processed by the control unit 160. That is, the display panel 131 may display various information required for providing the geo-fence alarm service. For example, the display panel 131 may display a first map to which a geo-fence boundary line, an inbound boundary line, and an outbound boundary line are applied. The display panel 131 may be at least one of a Liquid Crystal Display (LCD) and an Organic Light-Emitting Diode (OLED). However, the display panel 131 is not limited thereto.

The touch panel 133 may detect a touch operation of a driver and receive information input by the driver. For example, the touch panel 133 may receive information for a reference setting the geo-fence boundary line (hereinafter, the setting reference) from the driver. The touch panel 133 may include at least one of a touch detecting means and a touch control unit. The touch detecting means detects a touch position of the driver and simultaneously detect a signal by the touch operation, and transmit the touch information to the touch control unit. The touch control unit may receive the touch information from the touch detecting means, and convert the corresponding information into a contact point coordinate and transmit the converted contact point coordinate to the control unit 160. Further, the touch control unit may receive a command from the control unit 160 and execute the received command.

The second input/output unit 140 may include a microphone unit 141 and a speaker unit 143.

The microphone unit 141 may receive a driver's voice signal in the analog form convert the received analog voice signal into a digital form, and transmit the converted voice signal to the control unit 160. For example, the microphone unit 141 may receive information for the setting reference that sets the geo-fence boundary line from the driver in the form of the voice signal.

The speaker unit 143 may output the result processed in the control unit 160 in the form of a voice signal. For example, the microphone unit 141 may output an alarm message corresponding to the entry of the moving object to the destination zone or exit of the moving object from the destination zone in the form of a voice signal.

The memory 150 may store the data, the program, or the geo-fence algorithm processed in the communication unit 110, the position measuring unit 120, the first input/output unit 130, the second input/output unit 140, and the control unit 160. For example, the memory 150 may include at least one type of storage medium among a flash memory type, a hard disk type, a multimedia card micro type, a card type of memory (for example, an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

The control unit 160 may determine whether the moving object enters the destination zone or the moving objects exits from the destination zone by generally controlling the mobile terminal 100, and generate an alarm message corresponding to the entry of the moving object or the exit of the moving object. For example, the control unit 160 may provide the geo-fence alarm service notifying the arrival to the destination zone or the exit from the destination zone to the customer possessing the mobile terminal 100 or the user (driver or occupant) of the moving object in which the mobile terminal 100 is installed.

The manager terminal 200 may be the terminal used by a manager who generally manages the geo-fence alarm service. For example, the manager terminal 200 may access the server 300 and check the geo-fence boundary line, the inbound boundary line, and the outbound boundary line generated by each of the plurality of mobile terminals 100. According to the exemplary embodiment, when some of the plurality of adjacent geo-fence boundary lines overlap, the manager terminal 200 solve the problem of the overlapping of the plurality of geo-fence boundary lines by transmitting a first correction message including predetermined first correction information received from the manager to the server 300.

Referring to FIG. 4, the manager terminal 200 includes a terminal communication unit 210, a terminal input/output unit 230, a terminal memory 250, and a terminal control unit 270.

The terminal communication unit 210 may be connected to a wireless communication network to transceive data with the server 300. The terminal communication unit 210 may be connected to the wireless communication network through various communication protocols identically or similar to the communication unit 110 of the mobile terminal 100 to transceive data with the server 300.

The terminal input/output unit 230 displays various required information for providing the moving object with the geo-fence alarm service and receive various inputs of the manager. In particular, the terminal input/output unit 230 may display a second map to which the geo-fence boundary line, the inbound boundary line, and the outbound boundary line generated in each of the plurality of mobile terminals 100 are applied. The terminal input/output unit 230 may receive a predetermined correction command from the manager.

The terminal input/output unit 230 may include a display means, such as a display panel (plasma display panel, PDP), a liquid crystal display (LCD) panel, a light emitting diode (LED) panel, or an organic light emitting diode (OLED) panel, and an active-matrix organic light-emitting diode (AMOLED) panel, for displaying the foregoing information.

The terminal input/output unit 230 may include, for example, a button input means, such as a keypad, a push button, or a membrane button, and a touch input means, such as a touch pad, for receiving information from the manager, and may also be implemented in the form of a touch screen in which both input and output are possible.

The terminal memory 250 may store data, an algorithm, and the like required for operating the manager terminal 200. According to the exemplary embodiment, in the terminal memory 250, the second map received through the terminal communication unit 210 may be stored.

The terminal control unit 270 generally controls the manager terminal 200. For example, the terminal control unit 270 receives information about the second map from the server 300 through the terminal communication unit 210 and displays the second map received through the terminal input/output unit 230. Further, the terminal control unit 270 may receive the first correction information of the manager from the terminal input/output unit 230, and transmit the first correction message including the first correction information to the server 300 through the terminal communication unit 210.

The server 300 may integrate and manage the geo-fence alarm service performed in each of the plurality of mobile terminals 100. For example, the server 300 may receive the first correction message from the manager terminal 200, and extract at least one mobile terminal 100 which transmits the inbound boundary line and the outbound boundary line corresponding to the first correction message. The server 300 may transmit a second correction message including second correction information to each of the extracted mobile terminals 100. The more detailed description is given with reference to FIGS. 6 to 10 below.

Referring to FIG. 5, the server 300 includes a server communication unit 310, a server memory 330, and a server control unit 350.

The server communication unit 310 may transceive data with each of the mobile terminal 100 and the manager terminal 200 by using the communication protocol through which the server communication unit 310 is capable of communicating with each of the mobile terminal 100 and the manager terminal 200.

The server memory 330 may store various information required for integrating and managing the geo-fence alarm service. For example, the server memory 330 may store information about the geo-fence boundary line, the inbound boundary line, and the outbound boundary line transmitted from each of the plurality of mobile terminals 100. Further, the server memory 330 may store the second map to which the geo-fence boundary line, the inbound boundary line, and the outbound boundary line transmitted from each of the plurality of mobile terminals 100 are applied.

The server control unit 350 may generally control the server 300. For example, the server control unit 350 may integrate and manage the geo-fence alarm service performed in each of the plurality of mobile terminals 100. Further, the server control unit 350 may generate the second correction message corresponding to each of the plurality of mobile terminals 100 according to the first correction message transmitted from the manager terminal 200.

Figure 6:
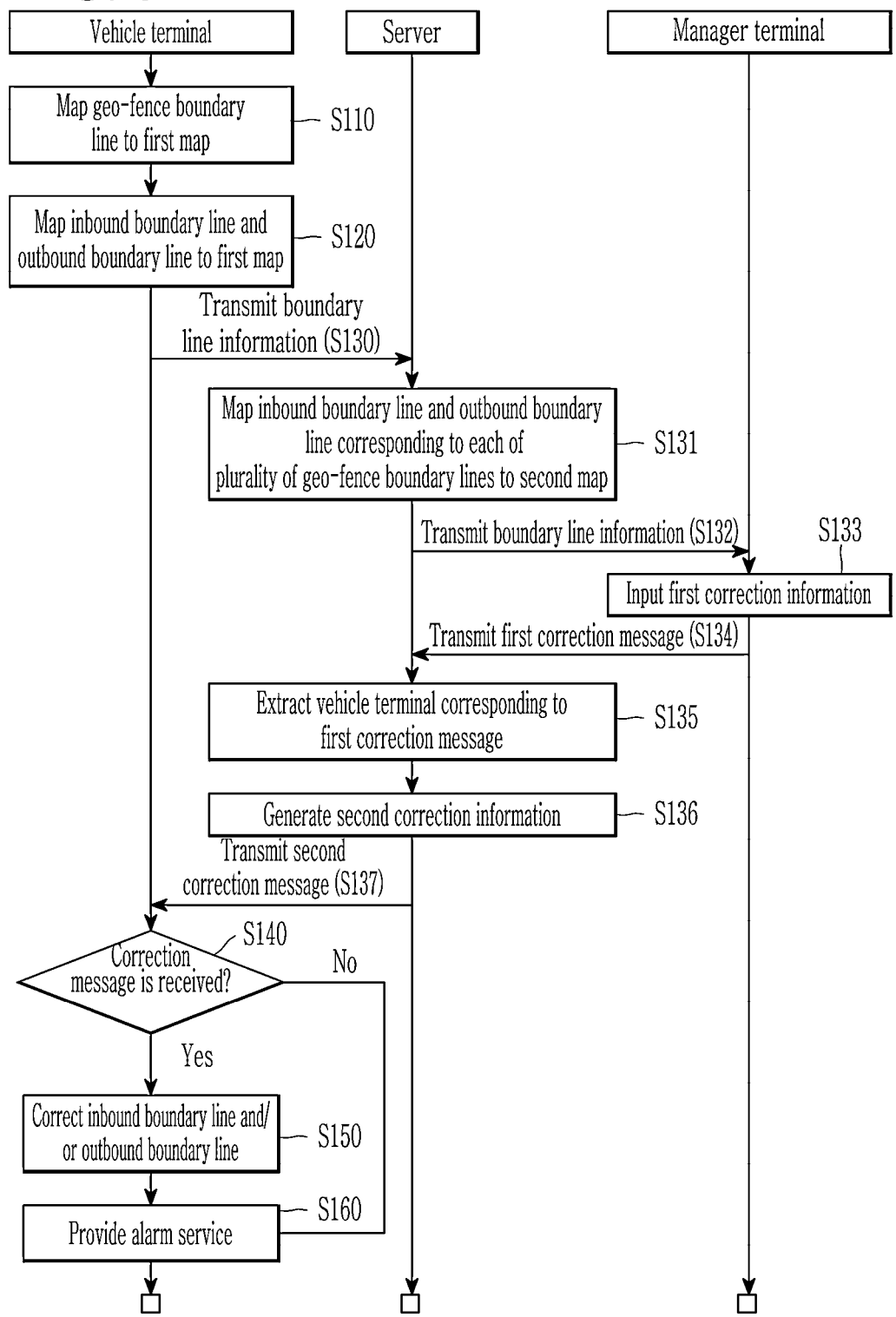
FIG. 6 is a flowchart illustrating a geo-fence alarm method according to an exemplary embodiment.
Figure 7:
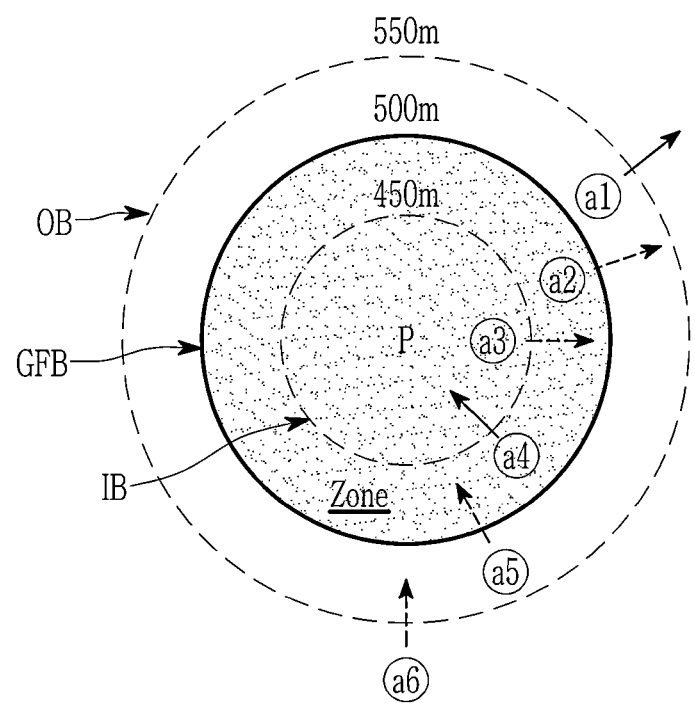
FIG. 7 is a diagram illustrating an example for describing a method of generating an alarm message corresponding to an entry of a moving object or an exit of a moving object according to the exemplary embodiment.
Figure 8:
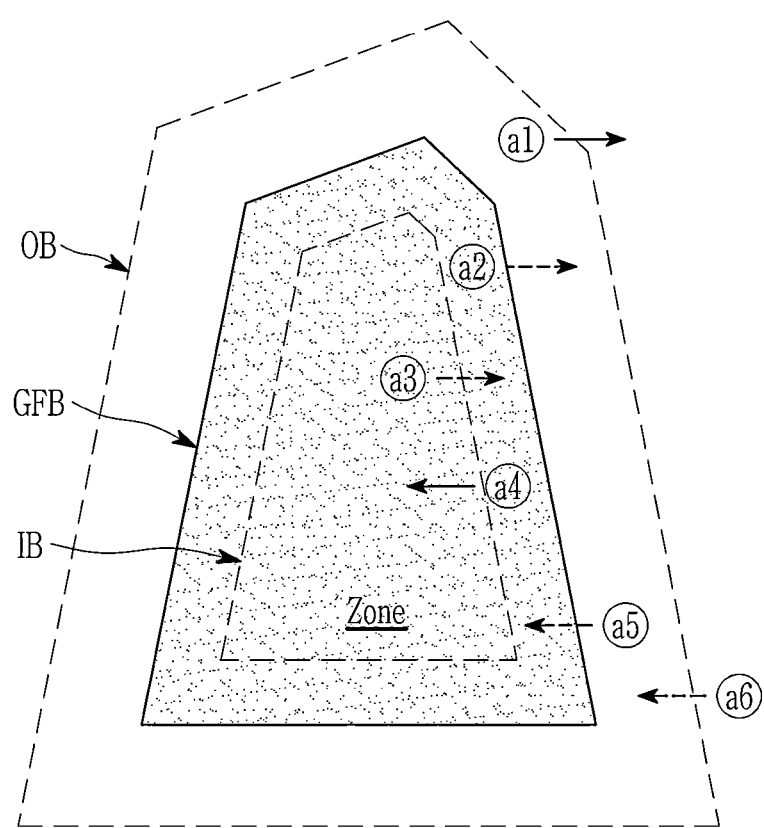
FIG. 8 is a diagram illustrating another example for describing a method of generating an alarm message corresponding to an entry of a moving object or an exit of a moving object according to the exemplary embodiment.
Figure 9:
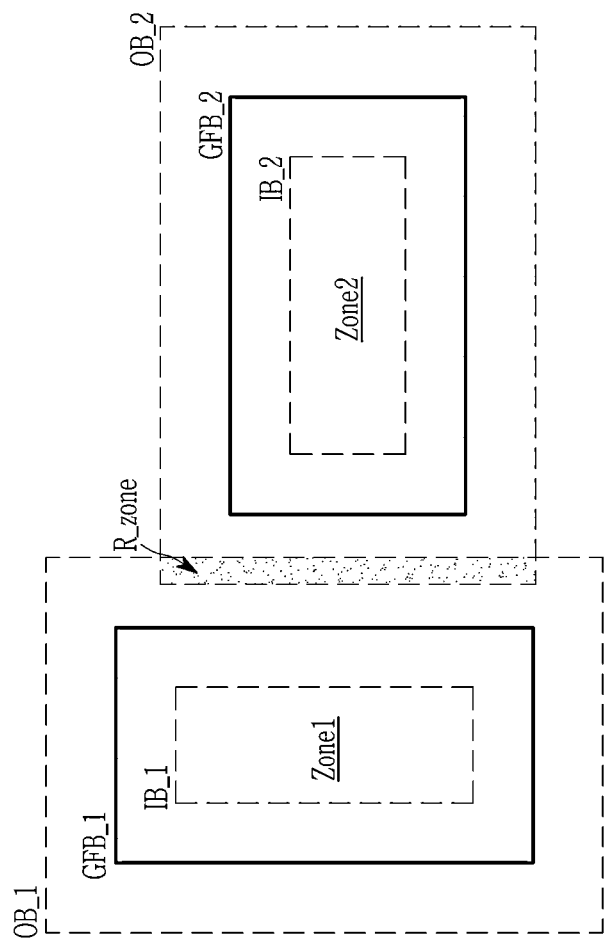
FIGS. 9 and 10 are diagrams illustrating an example of a method of correcting an overlapping outbound boundary line according to the exemplary embodiment.
Figure 10:
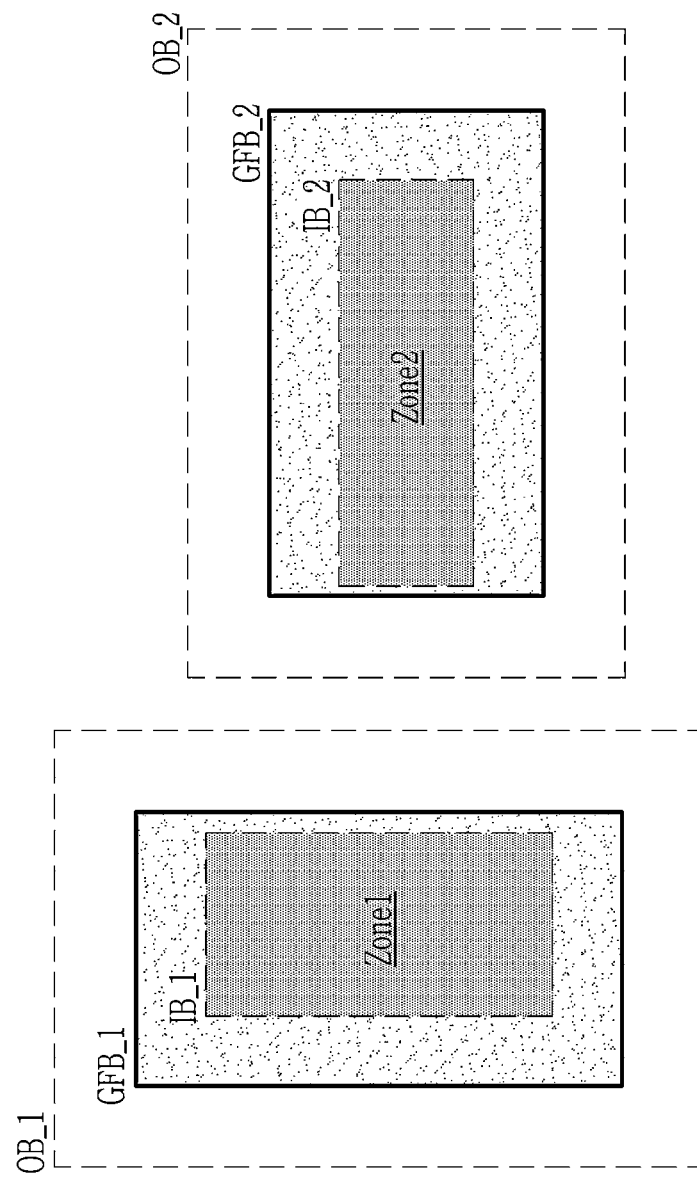

FIG. 6 is a flowchart illustrating a geo-fence alarm method according to an exemplary embodiment, FIG. 7 is a diagram illustrating an example for describing a method of generating an alarm message corresponding to entry of a moving object or exit of a moving object according to the exemplary embodiment, FIG. 8 is a diagram illustrating another example for describing a method of generating an alarm message corresponding to entry of a moving object or exit of a moving object according to the exemplary embodiment, and FIGS. 9 and 10 are diagrams illustrating an example of a method of correcting an overlapping outbound boundary line according to the exemplary embodiment.

Hereinafter, the geo-fence alarm method and a system for providing the method are described in detail with reference to FIGS. 2 to 10.

Referring to FIG. 6, first, the mobile terminal 100 generates a geo-fence boundary line that is a boundary line of a destination zone according to a predetermined setting reference and maps the generated geo-fence boundary line to a first map (S110).

In FIG. 6, the mobile terminal 100 is displayed as a vehicle terminal, but is not limited thereto, and the mobile terminal 100 may include a portable terminal and the like possessed by a user (customer).

The destination zone may be the zone to which the geo-fence technology is applied. The geo-fence technology is the technology that notifies the user of the geo-fence alarm service of the situation where a predetermined object (hereinafter, the moving object) enters a destination zone or exits from the destination zone.

The geo-fence boundary line may be the boundary line of the destination zone. For example, when the destination zone is set according to the predetermined setting reference, the boundary line of the destination zone may be determined as the geo-fence boundary line.

The first map may be the map displayed by the mobile terminal 100. That is, the first map may be the map to which the geo-fence boundary line, the inbound boundary line, and the outbound boundary line generated by the mobile terminal 100 are mapped.

According to the exemplary embodiment, the mobile terminal 100 may receive a first setting message including information about the setting reference from the driver of the moving object, generate a geo-fence boundary line that is the boundary of the destination zone according to the first setting message, and map the generated geo-fence boundary line to the first map. Referring to FIG. 7, the destination zone may be arbitrarily set according to an intention of the driver and the like. For example, the destination zone may be set as an area having a radius of 500 m based on a current position P. In this case, the geo-fence boundary line GFB may be formed of a circle with a radius of 500 m.

According to another exemplary embodiment, the mobile terminal 100 may receive a second setting message including information about the predetermined destination setting reference from the server 300, generate a geo-fence boundary line according to the received second setting message, and map the generated geo-fence boundary line to the first map. Referring to FIG. 8, the destination zone may be a preset zone. For example, the destination zone may be set as an administrative area, a public parking lot, and the like. In this case, the geo-fence boundary line may be formed of a boundary line of an administrative area, a public parking lot, and the like. The destination zone illustrated in FIG. 8 may be a parking lot to which a moving object provided to the car sharing service is returned. In FIG. 8, the geo-fence boundary line GFB may be displayed with a dotted line.

Next, the mobile terminal 100 generates an inbound boundary line spaced apart inwardly from the geo-fence boundary line by a first interval, and an outbound boundary line spaced apart outwardly from the geo-fence boundary line by a second interval and maps the generated inbound boundary line and outbound boundary line to the first map (S120).

According to the exemplary embodiment, the value for the first interval and the second interval may be predetermined. That is, when the geo-fence boundary line is established, the mobile terminal 100 may automatically establish an inbound boundary line which is spaced apart from the geo-fence boundary line by the first interval, and automatically establish an outbound boundary line which is spaced apart from the geo-fence boundary line by the second interval. For example, the first interval and the second interval may have the same value, but they are not limited thereto, and each of the first interval and the second interval may be set with various values.

In one form, referring to FIG. 7, the geo-fence boundary line GFB forms a circle having the radius of 500 m, surrounding the current position P, the mobile terminal 100 may automatically establish the inbound boundary line IB which is spaced apart inwardly from the circular GFB (i.e., the circle having the radius of 500 m) by the interval (e.g., a distance) of 50 m, and automatically establish the outbound boundary line OB which is spaced apart outwardly from the circular GFB by the interval of 50 m. In this case, each of the first interval and the second interval may be preset to 50 m, but is not limited thereto.

In another form, referring to FIG. 8, the geo-fence boundary line GFB may define the parking lot to which the moving object is returned. In this case, the geo-fence boundary line GFB forms a polygon, and the mobile terminal 100 may automatically establish the inbound boundary line IB, along the boundary line GFB, spaced apart inwardly from the boundary line GFB by the interval of 50 m, and automatically establish the outbound boundary line OB, along the boundary line GFB, spaced apart outwardly from the boundary line GFB by the interval of 50 m. In this case, each of the first interval and the second interval may be preset by 50 m, but is not limited thereto.

According to another exemplary embodiment, the mobile terminal 100 may receive the values for the first interval and the second interval from the driver of the moving object or the mobile terminal 100 may receive the values for the first interval and the second interval from the server 300. For example, the mobile terminal 100 may receive a third setting message including information about the inbound boundary line and the outbound boundary line from the server 300. The mobile terminal 100 may generate the inbound boundary line and the outbound boundary line according to the third setting message. That is, the mobile terminal 100 may receive information about the first interval of the inbound boundary line and information about the second interval of the outbound boundary line, and generate the inbound boundary line and the outbound boundary line according to the received information.

Next, the mobile terminal 100 transmits the information about at least one of the geo-fence boundary line GFB, the inbound boundary line, and the outbound boundary line to the server 300 (S130).

According to the exemplary embodiment, when the mobile terminal 100 generates the geo-fence boundary line GFB, the inbound boundary line and the outbound boundary line without receiving an instruction from the server 300, the mobile terminal 100 may transmit the information about the generated geo-fence boundary line GFB, inbound boundary line, and outbound boundary line to the server 300.

In operation S130, the server 300 may receive the information about the inbound boundary line and the outbound boundary line from each of the plurality of mobile terminals 100, and map at least one of the inbound boundary line and the outbound boundary line corresponding to each of the plurality of geo-fence boundary lines to the second map based on the received information (S131).

The second map may be the map in which the plurality of geo-fence boundary lines executed in the plurality of mobile terminals 100, and the inbound boundary line and the outbound boundary line corresponding to each of the plurality of geo-fence boundary lines are mapped.

In S130, the server 300 transmits the information about the second map to the manager terminal 200 (S132). Otherwise, the manager terminal 200 may access the server 300 and receive the information about the second map.

In S130, the manager terminal 200 displays the second map to the manager, and receives first correction information about one or more of the inbound boundary line and the outbound boundary line corresponding to each of the plurality of geo-fence boundary lines from the manager (S133).

Referring to FIG. 9, an outbound boundary line OB_1 of a first geo-fence boundary line GFB_1 and an outbound boundary line OB2 of a second geo-fence boundary line GFB_2 may overlap each other. When a method of identifying the two geo-fence boundary lines is not used, and when the moving object moves to a second destination zone zone2 from a first destination zone zone1, an alarm message corresponding to the exit of the moving object from the overlapping zone R_zone may not be generated. Otherwise, due to the existence of the overlapping zone R_zone, an error may occur in generating the alarm message.

Referring to FIG. 10, the manager may input the first correction information which is to be described below to the manager terminal 200. For example, the first correction information may include reducing each of the second interval in the right direction of the first outbound boundary line OB_1 and the second interval in the left direction of the second outbound boundary line OB_2 to a predetermined interval. Further, the first correction information may include moving the first inbound boundary line IB_1 to be adjacent to the right side of the first geo-fence boundary line GFB_1 in order to rapidly determine the entry of the moving object to the first destination zone zone1. Further, the first correction information may include moving the second inbound boundary line IB_2 to be adjacent to the left side of the second geo-fence boundary line GFB_2 in order to rapidly determine the entry of the moving object to the second destination zone zone2.

In operation S130, the manager terminal 200 transmits the first correction message including the first correction information to the server 300 (S134).

The first correction information may include information about at least one of a movement direction and a movement distance, a reduced interval, an enlarged interval, and a correction position for each of the inbound boundary line and the outbound boundary line. Referring to FIG. 10, the first correction information may include reducing the second interval in the right direction of the first outbound boundary line OB_1 and the second interval in the left direction of the second outbound boundary line OB_2 to predetermined intervals, respectively, moving the first inbound boundary line IB_1 to be adjacent to the right side of the first geo-fence boundary line GFB_1, and moving the second inbound boundary line IB_2 to be adjacent to the left side of the second geo-fence boundary line GFB_2.

In operation S130, the server 300 extracts the mobile terminal which has transmitted the inbound boundary line and the outbound boundary line corresponding to the first correction message (S135).

Referring to FIG. 10, for example, the server 300 may extract a first mobile terminal which has transmitted the information about the first inbound boundary line IB_1 and the first outbound boundary line OB_1 and a second mobile terminal which has transmitted the information about the second inbound boundary line IB_2 and the second outbound boundary line OB_2.

In operation S130, the server 300 transmits a second correction message including second correction information to each of the extracted mobile terminals 100 (S136 and S137)

The second correction information may include information about at least one of a movement direction and a movement distance, a reduced interval, an enlarged interval, and a correction position for each of the inbound boundary line and the outbound boundary line corresponding to the extracted mobile terminal.

Referring to FIG. 10, for example, the server 300 may transmit the second correction message including the second correction information about the reduction of the second interval in the right direction of the first outbound boundary line OB_1 and the movement of the first inbound boundary line IB_1 to be adjacent to the right side of the first geo-fence boundary line GFB_1 to the first mobile terminal. Further, the server 300 may transmit the second correction message including the second correction information about the reduction of the second interval in the left direction of the second outbound boundary line OB_2 to the predetermined interval and the movement of the second inbound boundary line IB_2 to be adjacent to the left side of the second geo-fence boundary line GFB_2 to the second mobile terminal.

Next, the mobile terminal 100 determines whether the second correction message including the correction information about the inbound boundary line and the outbound boundary line is received from the server 300 (S140).

When the correction message is transmitted as a result of the determination (YES in S140), the mobile terminal 100 corrects the inbound boundary line and the outbound boundary line based on the second correction information included in the second correction message (S150).

When the correction message is not transmitted as the result of the determination (NO in S140), or the inbound boundary line and the outbound boundary line are corrected, the mobile terminal 100 determines whether the moving object enters the destination zone based on the inbound boundary line and location information about the moving object, determines whether the moving object exits from the destination zone based on the outbound boundary line and the location information about the moving object, and generates an alarm message corresponding to the entry of the moving object or the exit of the moving object according to the result of the determination (S160).

When the moving object moves into the inbound boundary line from the outside of the inbound boundary line, the mobile terminal 100 may determine that the moving object enters the destination zone and generate a first alarm message corresponding to the entry of the moving object. When the moving object moves to the outside of the outbound boundary line from the inside of the outbound boundary line, the mobile terminal 100 may determine that the moving object exits the destination zone and generate a second alarm message corresponding to the exit of the moving object.

That is, the mobile terminal 100 does not determine the entry or the exit of the moving object based on the geo-fence boundary line, but determines the entry or the exit of the moving object based on the inbound boundary line and the outbound boundary line. Then, when the moving object wanders around the geo-fence boundary line, the mobile terminal 100 may prevent an erroneous alarm message from being generated due to a problem, such as a GPS error.

Referring to FIGS. 7 and 8, only when a fourth situation a4 where the moving object moves from the outside of the inbound boundary line IB to the inside of the inbound boundary line IB occurs, the mobile terminal 100 may generate the first alarm message corresponding to the entry of the moving object. That is, in a fifth situation a5 and a sixth situation a6, the mobile terminal 100 does not generate the first alarm message. Further, only when a first situation a1 where the moving object moves from the inside of the outbound boundary line OB to the outside of the outbound boundary line OB occurs, the mobile terminal 100 may generate the second alarm message corresponding to the exit of the moving object. That is, the mobile terminal 100 does not generate the second alarm message in a second situation a2 and a third situation a3.

While this present disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the present disclosure.

What is claimed is:

1. A system comprising:
a plurality of mobile terminals equipped in a plurality of moving objects respectively, wherein each of the plurality of mobile terminals is configured to:
generate a geo-fence boundary line corresponding to a boundary line of a destination zone based on a predetermined setting reference and map the generated geo-fence boundary line to a first map, wherein each of the plurality of mobile terminals is configured to receive a first setting message including information about the predetermined setting reference from a user of a corresponding moving object of the plurality of moving objects, and generate the geo-fence boundary line based on the first setting message, generate an inbound boundary line spaced apart inwardly from the geo-fence boundary line by a predetermined interval and an outbound boundary line spaced apart outwardly from the geo-fence boundary line by a predetermined interval, and map at least one of the inbound boundary line or the outbound boundary line to the first map, determine whether the corresponding moving object enters the destination zone based on the inbound boundary line and location information of the moving object, and determine whether the corresponding moving object exits from the destination zone based on the outbound boundary line and the location information of the corresponding moving object, generate an alarm message corresponding to the entry of the corresponding moving object or the exit of the corresponding moving object, a server configured to:

receive information about inbound boundary lines and outbound boundary lines corresponding to a plurality of geo-fence boundary lines from the plurality of mobile terminals, respectively, and map the inbound boundary lines and the outbound boundary lines to a second map based on the received information; and a manager terminal configured to access the server and provide the second map to a manager, wherein the manager terminal is configured to:

receive first correction information about one or more of the inbound boundary line and the outbound boundary line corresponding to each of the plurality of geo-fence boundary lines from the manager, and transmit a first correction message including the first correction information to the server, and wherein the first correction information includes information about at least one of a movement direction and a movement distance, a reduced interval, an enlarged interval, or a correction position for at least one of the inbound boundary line and the outbound boundary line.

2. The system of claim 1, wherein:

when the corresponding moving object moves from an outside to an inside of the inbound boundary line, each of the plurality of mobile terminals is configured to determine that the corresponding moving object enters the destination zone and generate a first alarm message.

3. The system of claim 2, wherein:

when the corresponding moving object moves from an inside to an outside of the outbound boundary line, each of the plurality of mobile terminals is configured to determine that the corresponding moving object exits the destination zone, and generate a second alarm message.

4. The system of claim 3, wherein:

each of the plurality of mobile terminals is configured to:

receive a second setting message including information about the predetermined setting reference from the server, and generate the geo-fence boundary line according to the second setting message.

5. The system of claim 4, wherein:

each of the plurality of mobile terminals is configured to:

receive a third setting message including information about the inbound boundary line and the outbound boundary line from the server, and generate the inbound boundary line and the outbound boundary line according to the third setting message.

6. The system of claim 1, wherein:

the server is configured to:

identify, among the plurality of mobile terminals, a mobile terminal which has transmitted the inbound boundary line and the outbound boundary line corresponding to the first correction message, and transmit a second correction message including second correction information to the identified mobile terminal, and wherein the second correction information includes information about at least one of a movement direction and a movement distance, a reduced interval, an enlarged interval, or a correction position for each of the inbound boundary line and the outbound boundary line corresponding to the identified mobile terminal.

7. The system of claim 6, wherein:

the mobile terminal is configured to:

correct the inbound boundary line and the outbound boundary line based on the second correction information, and map the corrected inbound boundary line and the corrected outbound boundary line to the first map.

8. A geo-fence alarming method of using a system comprising a plurality of mobile terminals equipped in a plurality of moving objects, respectively, the method comprising:

determining, by each of the plurality of mobile terminals, an entry of a corresponding moving object of the plurality of moving objects into a destination zone or an exit of the corresponding moving object from the destination zone;

generating, by each of the plurality of mobile terminals, a geo-fence boundary line defining the destination zone according to a predetermined setting reference and mapping the generated geo-fence boundary line to a first map, wherein generating the geo-fence boundary line includes receiving a first setting message including information about the predetermined setting reference from a user of the moving object, and generating the geo-fence boundary line according to the first setting message;

generating, by each of the plurality of mobile terminals, an inbound boundary line and an outbound boundary line, wherein the inbound boundary line is established around the geo-fence boundary line while being spaced apart inwardly from the geo-fence boundary line by a predetermined interval and the outbound boundary line is established around the geo-fence boundary line while being spaced apart outwardly from the geo-fence boundary line by a predetermined interval;

mapping, by each of the plurality of mobile terminals, at least one of the inbound boundary line or the outbound boundary line to the first map; and determining, by each of the plurality of mobile terminals, whether the corresponding moving object enters the destination zone based on the inbound boundary line and location information of the moving object and whether the corresponding moving object exits from the destination zone based on the outbound boundary line and the location information of the moving object;

generating, by each of the plurality of mobile terminals, an alarm message corresponding to the entry of the corresponding moving object or the exit of the corresponding moving object according to a result of the determination;

receiving, by a server, information about inbound boundary lines and outbound boundary lines corresponding to a plurality of geo-fence boundary lines from the plurality of mobile terminals, respectively, mapping, by the server, the inbound boundary lines and the outbound boundary lines to a second map based on the received information;

accessing, by a manager terminal, the server and providing the second map to a manager; and receiving, by a manager terminal, first correction information about one or more of the inbound boundary line and the outbound boundary line corresponding to each of the plurality of geo-fence boundary lines from the manager, and transmitting, by a manager terminal, a first correction message including the first correction information to the server, and wherein the first correction information includes information about at least one of a movement direction and a movement distance, a reduced interval, an enlarged interval, or a correction position for at least one of the inbound boundary line and the outbound boundary line.

9. The method of claim 8, wherein:
generating the alarm message includes:
in response to determining that the corresponding moving object moves from an outside to an inside of the inbound boundary line, determining that the corresponding moving object enters the destination zone, and
generating a first alarm message.

10. The method of claim 9, wherein:
generating the alarm message includes:
in response to determining that the corresponding moving object moves from an inside to an outside of the outbound boundary line, determining that the corresponding moving object exits the destination zone, and
generating a second alarm message.

11. The method of claim 10, wherein:
generating the geo-fence boundary line includes:
receiving a second setting message including information about the predetermined setting reference from the server, and
generating the geo-fence boundary line according to the second setting message.

12. The method of claim 11, wherein:
generating the inbound and outbound boundary lines includes:
receiving a third setting message including information about the inbound boundary line and the outbound boundary line from the server, and
generating the inbound boundary line and the outbound boundary line according to the third setting message.

13. The method of claim 8, further comprising:
subsequent to generating the inbound and outbound boundary lines,
transmitting information about the geo-fence boundary line, the inbound boundary line, and the outbound boundary line to the server;
determining whether a correction message including correction information about the inbound boundary line and the outbound boundary line is transmitted from the server; and
in response to receiving the correction message, correcting the inbound boundary line and the outbound boundary line based on the correction information.

14. The method of claim 13, wherein:
the correction information includes information about at least one of a movement direction and a movement distance, a reduced interval, an enlarged interval, and a correction position for each of the inbound boundary line and the outbound boundary line.

* * * * *